United States Patent [19]

Parsons et al.

[11] Patent Number: 5,456,279
[45] Date of Patent: Oct. 10, 1995

[54] DIAPHRAGM-TYPE PILOT VALVE HAVING A SELF-CLEANING CONTROL ORIFICE

[75] Inventors: Natan E. Parsons, Brookline; Joel S. Novak, Sudbury, both of Mass.

[73] Assignee: Recurrent Solutions Limited Partnership, Cambridge, Mass.

[21] Appl. No.: 167,666

[22] Filed: Dec. 15, 1993

[51] Int. Cl.[6] .................. F16K 31/385; F16K 31/145; F16K 31/40
[52] U.S. Cl. .................. 137/245; 251/31.04; 251/30.05; 251/40; 251/45
[58] Field of Search ................ 137/242, 244, 137/245, 414; 251/30.02, 39, 40, 45, 46, 30.04, 30.05

[56] References Cited

U.S. PATENT DOCUMENTS

| | | | |
|---|---|---|---|
| 207,482 | 8/1878 | Blessing | 137/245 |
| 1,501,331 | 7/1924 | Gulick | 137/245 |
| 2,471,328 | 5/1949 | Jones | 137/403 |
| 2,619,122 | 11/1952 | Hunter | 137/414 |
| 2,685,301 | 8/1954 | Dreier | 137/386 |
| 2,827,073 | 3/1958 | Owens | 137/426 |
| 2,877,791 | 3/1959 | Rich | 137/487 |
| 2,923,314 | 2/1960 | Badger et al. | 137/245 |
| 2,986,155 | 5/1961 | Doyle | 137/414 |
| 3,058,485 | 10/1962 | McQueen | 137/403 |
| 3,242,940 | 3/1966 | Sirotek | 137/414 |
| 3,254,664 | 6/1966 | Delaney et al. | 251/331 |
| 3,285,261 | 11/1966 | Chaney | 137/491 |
| 3,318,565 | 5/1967 | Cutler | 251/45 |
| 3,386,462 | 6/1968 | Walters | 137/244 |
| 3,400,731 | 9/1968 | McCormack | 137/245 |
| 3,495,803 | 2/1970 | Schoepe et al. | 137/414 |
| 3,559,675 | 2/1971 | Schoepe et al. | 137/414 |
| 3,586,017 | 6/1971 | Walters | 137/403 |
| 3,693,649 | 9/1972 | Gordon et al. | 137/414 |
| 3,763,881 | 10/1973 | Jones | 251/45 |
| 3,842,857 | 10/1974 | McCormack | 251/39 |
| 3,895,645 | 7/1975 | Johnson | 137/414 |
| 4,065,095 | 12/1977 | Johnson | 137/414 |
| 4,105,186 | 8/1978 | Eby | 251/46 |
| 4,272,052 | 6/1981 | Gidner | 251/40 |
| 4,787,411 | 11/1988 | Molderhauer | 137/244 |
| 5,027,850 | 7/1991 | Peterson et al. | 137/245 |

Primary Examiner—Grorge L. Walton
Attorney, Agent, or Firm—Cesari and McKenna

[57] ABSTRACT

A reaming pin (70) is provided in a control orifice (34) by which pressure from a main chamber (26) is communicated to a control chamber (36) so as to provide force to hold a main valve member in the form of a flexible diaphragm (12) against a valve seat (14) and thus prevent fluid from flowing from the main chamber (26) to an outlet orifice (32). The control orifice (34) is displaced from the center of the diaphragm (12), but the reaming pin is so provided as to cause the variation in the lateral spacing between the pin (70) and the control-orifice walls to be less than it would be if the reaming pin were a straight, inflexible member rigidly mounted perpendicularly to the plane of the valve seat (14). In one version, the pin (70) is mounted on the diaphragm (12) itself and thus moves laterally with it. In another version, the pin (70') is pivotably mounted on the valve body so as to permit such motion. Alternately, the pin (70") can be made flexible enough that such lateral motion in the pin results from engagement with the control-orifice walls without causing binding. In another version, the pin (70''') can be so curved as to reduce the lateral-spacing variation that results from diaphragm motion.

5 Claims, 5 Drawing Sheets

DIAPHRAGM-TYPE PILOT VALVE HAVING A SELF-CLEANING CONTROL ORIFICE

BACKGROUND OF THE INVENTION

The present invention is directed to diaphragm-type pilot-operated valves and in particular to those of the type that provide control orifices in their main diaphragms.

Pilot-operated vanes of the diaphragm type occur in widely varying configurations in which the invention to be described below can be practiced. FIG. 1 depicts one type, which is commonly used in public-facility urinals and closets. The vane 10 depicted in FIGS. 1 and 2 is shown in its closed condition, in which a diaphragm 12 is disposed on a valve seat 14 formed on the lower part 16 of a valve body that also includes an upper body part 18 comprising a dome or cap 20 that clamps the diaphragm 12 against the lower body part 16 by the action of an upper housing 22 that threadedly engages the outer surface of the lower body part 16.

In the closed position that FIG. 1 depicts, water that has entered by way of an inlet pipe 24 into an annular main chamber 26 surrounding a cylindrical inner wall 30 of the lower body part 16 is prevented by the diaphragm 12 from flowing from that main chamber 26 into an outlet conduit 32. Although the water in the main chamber 26 is under pressure, the diaphragm 12 resists the pressure because a control orifice 34 has allowed pressure equalization to occur between the main chamber 26 and a pilot chamber 36 formed by the dome 20 and the diaphragm 12; i.e., the diaphragm 12 divides into two parts a composite chamber that the valve body forms, but the control orifice tends to equalize the individual chambers' pressures.

The pressure in the pilot chamber 36 acts downward on the diaphragm 12 over an area greater than that over which the same pressure acts upward from the main chamber 26, so the force tending to keep the valve closed exceeds that tending to open it. To open this main valve, some type of pressure-relief mechanism is operated to relieve the pressure in the pilot chamber. In the illustrated example, a pilot valve described below is provided in the main diaphragm itself for this purpose, but the teachings of the invention to be described below are applicable to other types of pressure-relief mechanisms, too. In our U.S. Pat. No. 5,125,621 for a Flush System, for instance, the pressure-relief mechanism comprises a pilot valve in the cap.

The diaphragm 12 includes a disk-shaped main flexible diaphragm plate 38, to the interior of which, as is best seen in FIG. 2, is secured an elongated generally cylindrical guide member 40 by a collar 42 and a retaining ring 44. The collar 42 both stiffens the diaphragm assembly and acts as a guide by virtue of an annular guide-flange portion 46 extending upward from its upper surface. At the lower end of the lower cylindrical guide member 40 are provided spacer fins 48, which engage the lower body part's cylindrical inner wall 30 while permitting flow between the wall 30 and the cylindrical guide member 40.

To open the main valve—i.e., to permit the diaphragm assembly 12 to be lifted from the main valve seat 14 and thereby allow flow from the inlet conduit 24 to the outlet conduit 32—the pressure in the pilot chamber 36 is relieved through a relief opening 49 in the main diaphragm assembly 12 by displacing a pilot valve member 50 from a pilot seat 52 formed in the diaphragm plate 38. Specifically, operation of a lever 54 causes a plunger 56 to be driven to the left in FIG. 1 against a rod portion 58 of the valve member 50, and the resulting mechanical advantage enables the user to open the pilot valve readily against the force that the pilot-chamber pressure applies to the pilot valve member 50. Although the drawing depicts a manually operated pilot valve, those skilled in the art will recognize that pilot-valve operation is often performed automatically by a solenoid or other electromechanical operator, and it will be apparent that the invention described below is applicable to automatically operated valves, too.

When the pilot valve 50 is displaced, water flows with minimal flow resistance from the pilot chamber 36 through the relief opening 49, while the control orifice 34 in the diaphragm plate 38 imposes considerable resistance to the compensating flow from the main chamber 26 through orifice 34 to the pilot chamber 36. Consequently, the pressure in the pilot chamber decreases enough that the force exerted by it is lower than that exerted by the pressure in the main chamber 26. The portion of the diaphragm plate 38 interior to its clamped portion 59 accordingly flexes upward, rising off the main valve seat 14; i.e., the valve opens.

When the user releases the lever 54, the pilot valve 50 returns to its position on pilot valve seat 52, but the pressure in the pilot chamber 36 does not immediately return to the level in the main chamber 26, because the pressure-equalizing flow from the main chamber 26 to the pilot chamber 36 is restricted by the small size of the control orifice 34. This is desirable because it is necessary for proper urinal operation that flow continue for a predetermined length of time. Ultimately, however, the pressure difference is reduced to the point at which the downward force on the main diaphragm 12 overcomes the upward force, and the valve closes.

From the foregoing discussion, it will be appreciated that the size of the control orifice 34 has significant operational implications. Specifically, if the control orifice is too large, pressure equalization will occur too rapidly after the lever 54 is released, water hammer will result, and water will not flow for the requisite time interval. It is therefore necessary for the flow path through the orifice to be sufficiently narrow. Unfortunately, the small size of the control orifice in pilot-operated valves of this type is one of the biggest-if not the biggest-source of maintenance problems; because of its small size, the control orifice is particularly vulnerable to being clogged by water-borne particles and thus being prevented from closing the valve.

SUMMARY OF THE INVENTION

We have recognized that this problem can be reduced significantly by providing the valve with a reaming pin so disposed in the control orifice as to slide with respect to it as the main valve operates. Reaming pins have been used in control orifices before, but the valves that employed this approach previously have their control orifices in the center of the flexible diaphragm. Designs in which the control orifice is disposed off-center as it is in the design of FIGS. 1 and 2 have not been provided with reaming pins. Presumably, this is because it had previously been thought that to do so would interfere with diaphragm operation: unlike centrally disposed control orifices, control orifices that are displaced from the centers of the diaphragms in which they are provided do not undergo rectilinear motion as the diaphragm flexes, so the presence of a reaming pin would seem to present a significant problem.

However, we have recognized that there are many ways to provide a reaming pin without causing the diaphragm and reaming pin to bind or wear excessively even if the control orifice is not located in the center of the diaphragm, where its motion is substantially normal to the plane of the main valve seat. For instance, one can pivotably mount the pin on the valve body so that it can move with diaphragm motion and minimize the resultant interference with that motion.

Another approach is not necessarily to mount the reaming pin pivotably but to curve it substantially in the shape of the path that would be taken by the control orifice in the absence of the reaming pin. Indeed, the interference could be minimized by both curving the pin and mounting it pivotably.

Yet another approach is to make the reaming pin flexible enough that binding or excessive wear is not caused by the force that the pin exerts on the diaphragm.

Finally, the desired effect can be achieved by slidably mounting the reaming pin on the flexible diaphragm itself. As will be explained below, this can readily be done in such a manner that diaphragm flexure causes the pin to ream the control orifice yet follow lateral orifice movement so as to minimize reaming-pin interference with that movement. Such an arrangement affords benefits even for centered control orifices because it reduces registration problems during assembly.

BRIEF DESCRIPTION OF THE DRAWINGS

These and further features and advantages of the present invention are described below in connection with the accompanying drawings, in which.

DETAILED DESCRIPTION OF ILLUSTRATIVE EMBODIMENTS

Figure 1:
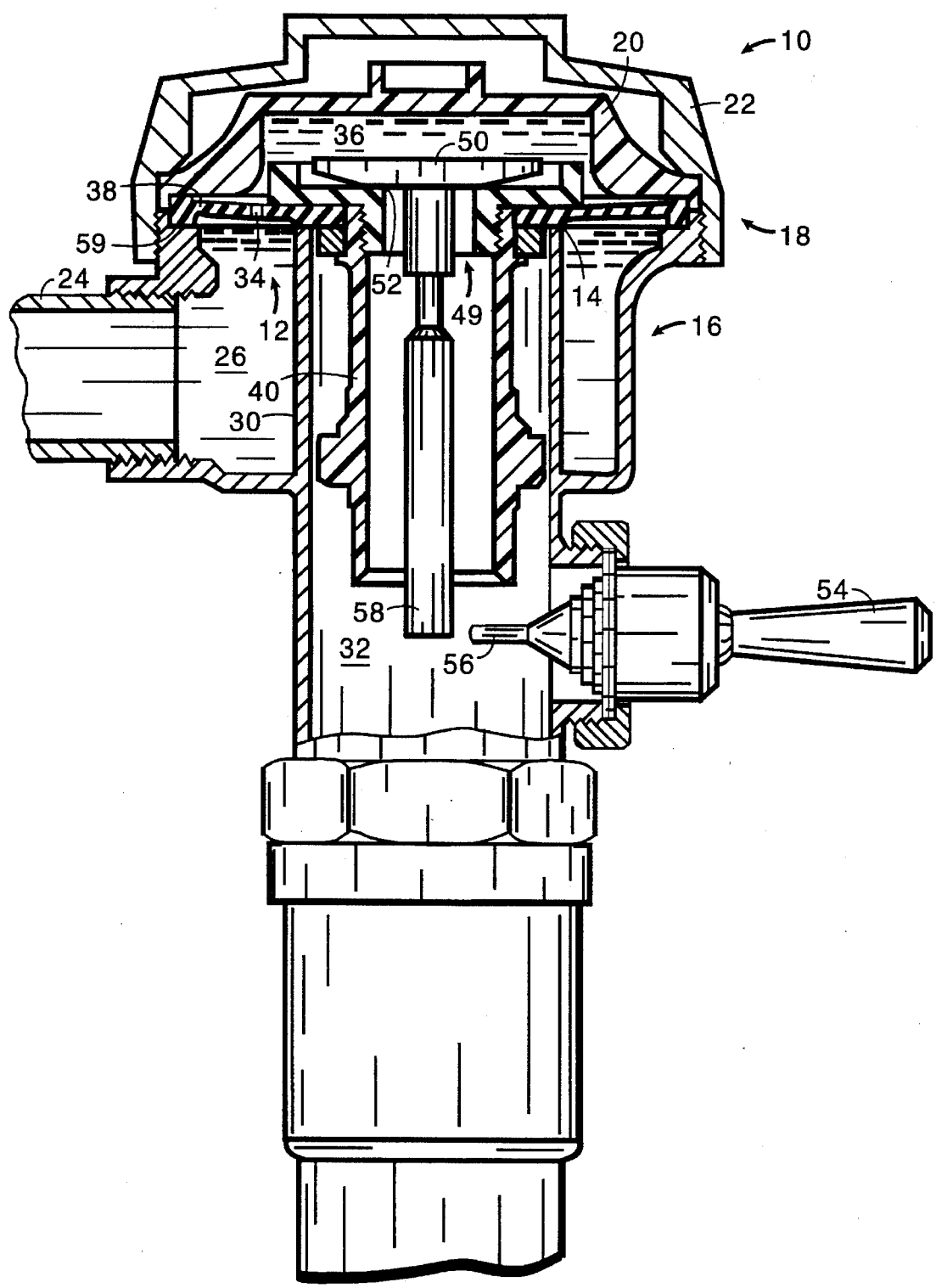
FIG. 1, previously described, is a cross-sectional view of a pilot-operated diaphragm-type valve of the type that can be modified to embody the present invention.
Figure 2:
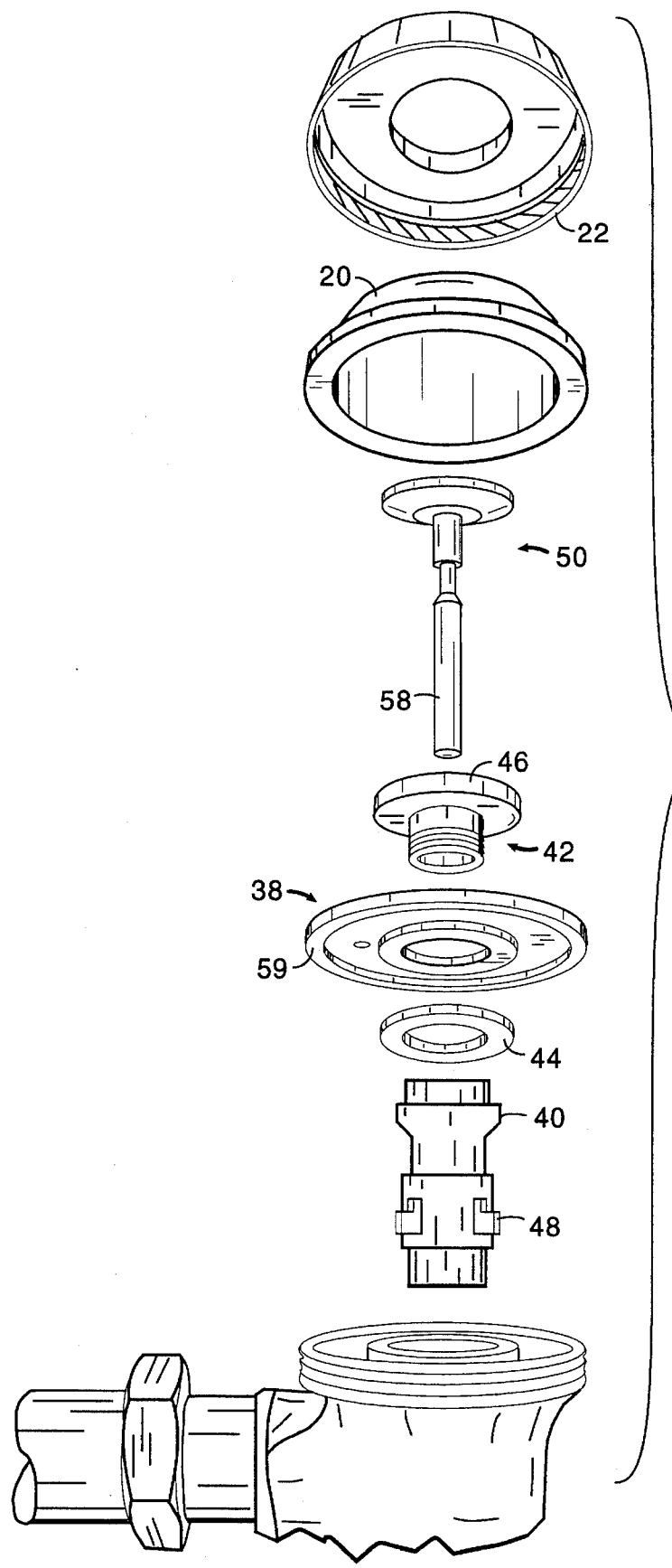
FIG. 2, previously described, is an exploded view of the valve of FIG. 1.
Figure 3:
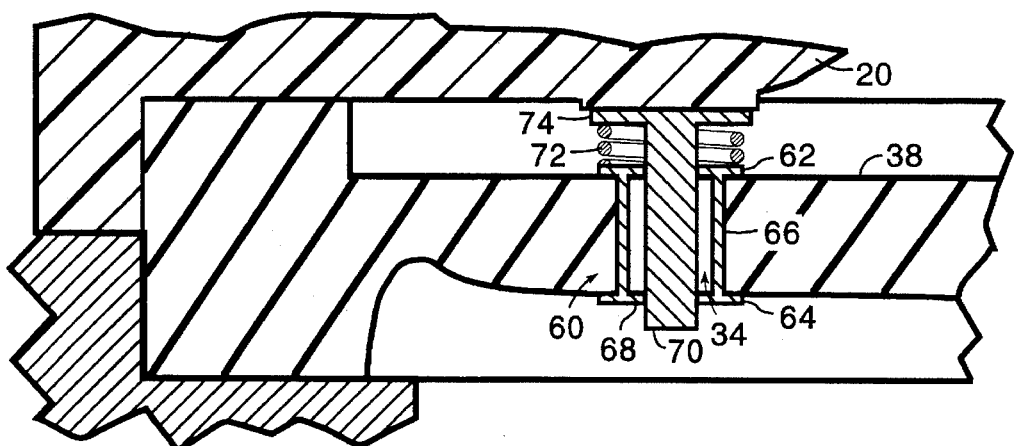
FIG. 3 is a detailed cross-sectional view of the control-orifice region of the valve of FIG. 1.
Figure 4:
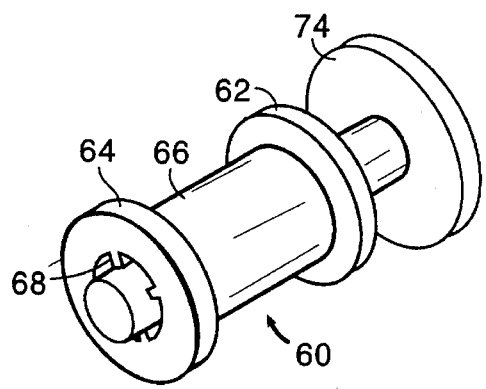
FIG. 4 is an isometric view of an eyelet and reaming pin depicted in FIG. 3.

To adapt a valve of the type depicted in FIGS. 1 and 2 to an embodiment of the present invention in which a reaming pin is mounted on the main diaphragm 38, an eyelet member 60 depicted in FIGS. 3 and 4 is snap fit into the control orifice 34, where flange portions 62 and 64 at opposite ends of a central cylindrical portion 66 secure the eyelet 59 in place. Spacer fins 68 laterally position a reaming pin 70 in the center of the eyelet, and thus of the control orifice 34, but permit it to slide in the orifice 34.

A spring 72 acts between eyelet flange 62 and an opposed flange 74 formed on the reaming pin 70 and thereby tends to urge the pin upward out of the orifice. However, the cap 20 of the valve's upper body part 18 prevents the reaming pin 70 from leaving the orifice. The cap 20 will ordinarily be so designed as to be disposed close enough to the diaphragm to perform this function, but the valve body in some designs may include a spacer 76 (FIG. 5) secured, for instance by screws 78, to a separate cap member 20.

When the pilot valve is opened and permits the pilot-chamber pressure to be relieved, the pressure in the main chamber 26 causes upward flexure of the flexible diaphragm plate 38. Although the resultant motion is predominantly upward, points on the diaphragm displaced from the center (as all of them are on the illustrated diaphragm plate 38) also undergo some lateral movement, i.e., some movement not perpendicular to the plane of the main vane seat. If the reaming pin did not also undergo such lateral movement, therefore, it would tend to cause the diaphragm plate 38 to bind against it and interfere with proper valve operation. Moreover, the degree to which this lateral motion occurs is a function of the water pressure to which the vane is exposed. Even in the absence of actual binding, the relative lateral motion would affect the flow cross section, which would make the valve-open time undesirably dependent on line pressure. And it would tend to cause wear on the orifice walls, which also would affect valve-open time undesirably.

Figure 5:
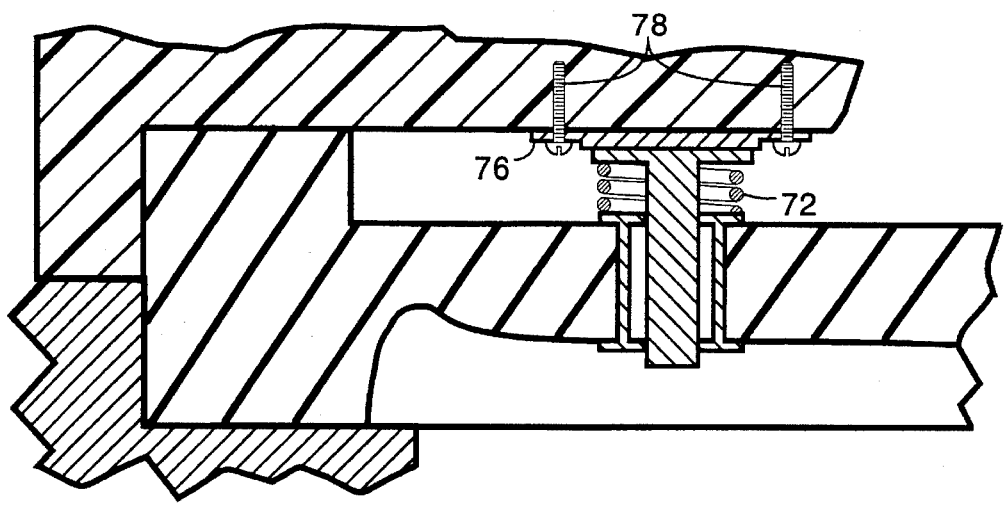
FIG. 5 is a view similar to FIG. 3 of an alternate embodiment of the invention.

In the arrangement of FIGS. 3–5, on the other hand, the reaming pin 70 is mounted on the diaphragm and thus undergoes lateral motion the same as that of the orifice 34. However, as the diaphragm plate 38 flexes, the cap 20 and spring 72 prevent the reaming pin 70 from following the diaphragm plate 38 vertical motion, and a reaming action accordingly results. This reaming action tends to dislodge particles that might otherwise clog the control orifice and prevent the valve from closing.

Figure 6:
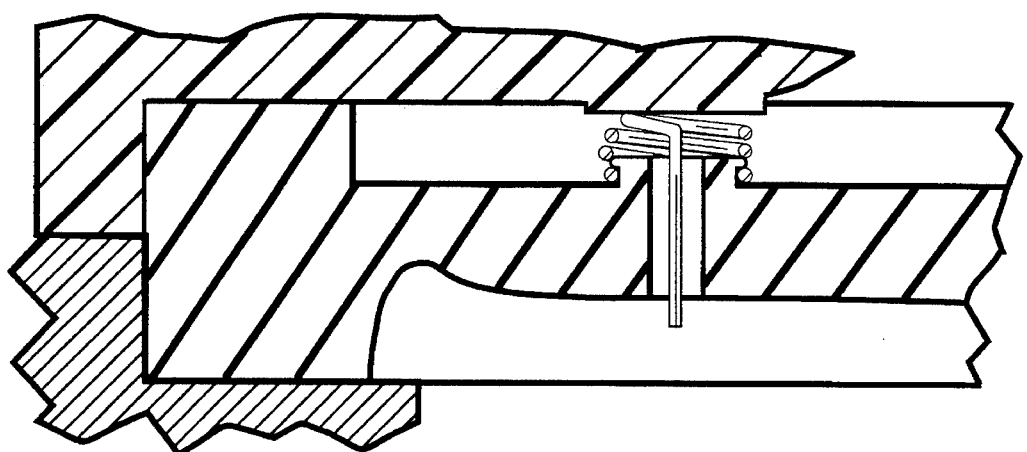
FIG. 6 is a view similar to FIG. 3 of another alternate embodiment of the invention.

Clearly, this principle can be carried out in any of a number of other ways. While the cap 20 in the illustrated embodiment serves as a pin-drive mechanism, causing the pin to slide in the control orifice under diaphragm flexure, the same function could be performed instead by, for instance, an appropriate surface provided for that purpose somewhere on the lower body part 16. It may also be preferable to make the spring and reaming pin a single piece, such as by providing the reaming pin as an axial "tail" of a coil spring snap fit onto the diaphragm, as FIG. 6 illustrates. Additionally, while we prefer this simple, positive type of pin-drive mechanism, the teachings of the present invention can be employed with other types of pin-drive mechanisms. For instance, pin-drive mechanisms that operate in response to the pressure difference between the main and pilot chambers could also be employed.

It will be appreciated that the invention's advantages are most pronounced in embodiments such as that depicted in FIG. 1, in which the valve seat that the diaphragm engages is the mouth of an outlet conduit that is centrally disposed in the sense that the main chamber is disposed outside the periphery of the mouth. That is, the flow enters the valve peripherally and leaves centrally. In contrast with an arrangement in which the fluid enters centrally and leaves peripherally, a valve such as that in FIG. 1 must have its control orifice offset from the diaphragm center, so the control orifice's motion tends not to be rectilinear when the diaphragm flexes. This means that the diaphragm would have a tendency to bind if a conventional reaming pin were employed.

But the invention affords advantages even for valve designs in which conventional reaming pins do not present a significant binding problem. Specifically, mounting the reaming pin on the diaphragm not only eliminates the binding problem but also avoids alignment problems that would otherwise be encountered during valve assembly. Such alignment problems would be encountered even in arrangements in which the control orifice is centrally located. The advantages of this aspect of the invention therefore are additionally applicable to arrangements of that type.

Figure 7:
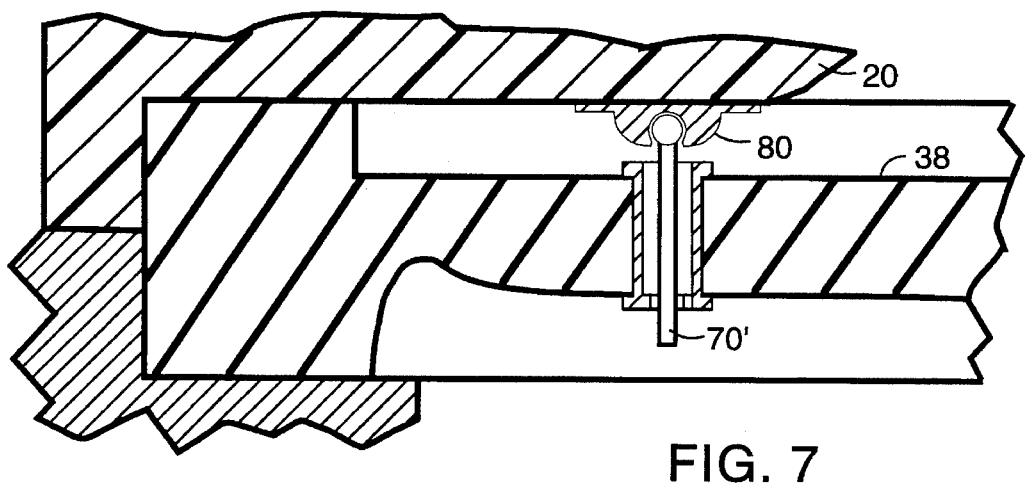
FIG. 7 is a view similar to FIG. 3 of an embodiment of the invention in which the reaming pin is pivotably mounted in a socket secured to a cap member in the valve body.
Figure 8:
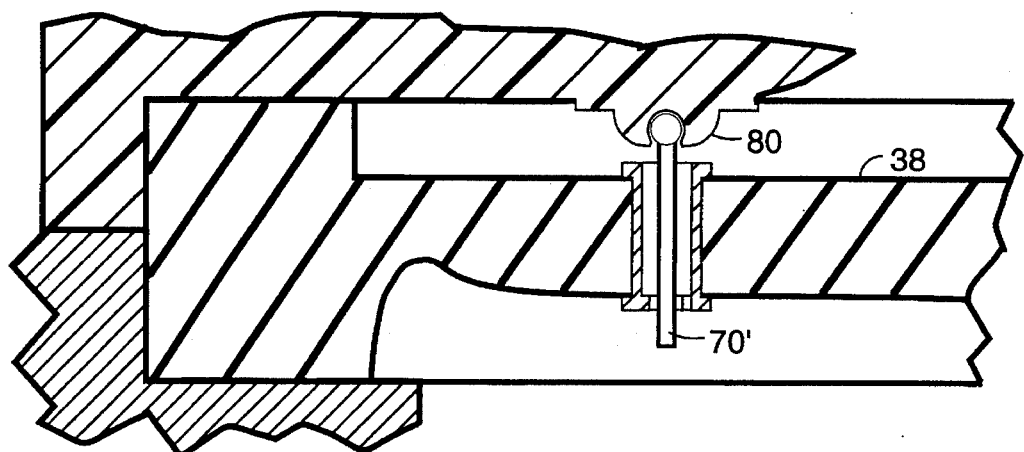
FIG. 8 is a view similar to FIG. 7 of an embodiment that is similar but has its socket formed integrally with the cap.

For this and other reasons, we prefer to employ this aspect of the invention. But for situations in which the alignment requirement can be tolerated, we have also found that it is possible to achieve much of the reduction in interference with diaphragm motion even when the pin is mounted on the valve body. In FIGS. 7 and 8, for instance, a socket 80 is either secured to the cap 20 as in FIG. 7 or formed integrally with it as in FIG. 8. In either case, the reaming pin 70 is pivotably mounted in the socket 80 for either one- or two-dimensional pivoting. The result of this arrangement is that, like the pin 70 of FIGS. 3–5, the pin 70' of FIGS. 7 and 8 undergoes lateral motion in response to corresponding lateral motion of the diaphragm plate 38 and thus has less of a tendency to bind to the diaphragm plate 38 or cause excessive wear.

Figure 9:
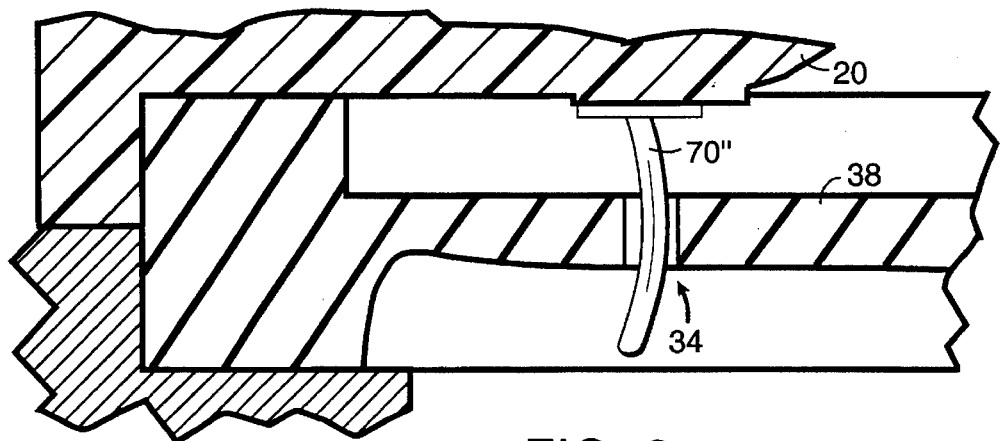
FIG. 9 is a view similar to that of FIG. 3 of an embodiment in which the reaming pin is curved to fit the unobstructed path of the control orifice.
Figure 10:
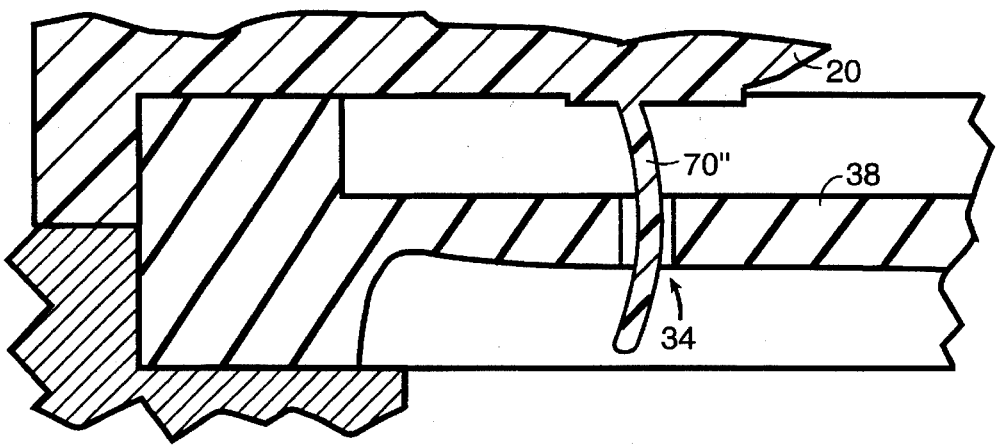
FIG. 10 is a view similar to that of FIG. 9 of an embodiment that is similar to that of FIG. 9 except that the reaming pin is formed integrally with a cap member in the valve body.

FIGS. 9 and 10 depict yet another approach. The reaming pin 70" is fixed in position with respect to the valve body, either being mounted on it as in FIG. 9 or being formed integrally with the cap 20 as in FIG. 10. The pin 70" is curved in such a manner as to make the variation in the lateral spacing between the reaming pin 70 and the control orifice's wall less than it would be if the pin were simply straight and perpendicular to the plane of the main valve seat. The variation reduction can also be obtained in some situations even if the reaming pin is straight but is so oriented as to form an angle with the normal to the valve-seat plane.

Finally, much of the reduction in diaphragm-motion interference can be obtained even without curving the pin or mounting it pivotally or at an angle if the reaming pin is made of material flexible enough that it will undergo lateral deformation under lateral force that is so low as not to impede diaphragm motion significantly. For this purpose, the pin should be at least flexible enough that it causes less lateral deformation of the orifice wall than the diaphragm causes of it as the diaphragm flexes. Preferably, the lateral stiffness is at least less than about 40 newtons/m. In the region located in the control orifice.

Figure 11:
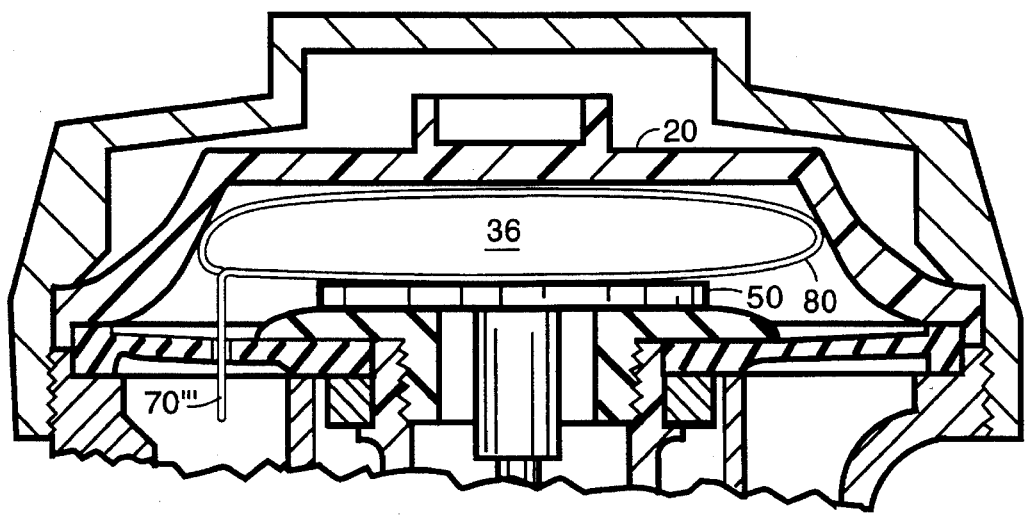
FIG. 11 is a detailed cross-sectional view of yet another embodiment of the invention.

FIG. 11 depicts one such arrangement, in which the reaming pin 70''' is provided as a leg on a resilient wire loop 80 disposed in the pilot chamber 36 and sandwiched between the cap 20 and the upper surface of the pilot valve 50. In this arrangement, some reaming occurs because of diaphragm movement as the main valve opens and closes, but this effect is relatively small because of the simultaneous deflection of the wire ring 80, which reduces the relative motion between the diaphragm and the reaming pin 70'''.

However, further reaming action also occurs as a result of pilot-valve operation: the pivoting of the pilot valve with respect to the remainder of the diaphragm causes the reaming pin to lift with respect to it. Thus, the pin-drive mechanism need not be based on diaphragm flexure.

Although the foregoing embodiments illustrate a number of ways of practicing the invention, they do not form an exhaustive list. It should be apparent, for instance, that these teachings can be carried out in arrangements in which the pilot valve is not provided on the main diaphragm. Additionally, although the reaming pin has been illustrated as having a simple circular cross-sectional shape, other arrangements, such as fluted ones, may be desired in some circumstances. Furthermore, although the diaphragm-mounted, pivotably mounted, and curved versions have been described separately, it will be clear that the advantages of the present invention can be obtained in valves that employ various combinations of these features. The invention thus lends itself to embodiment in a wide range of configurations and therefore constitutes a significant advance in the art.

We claim:

1. A pilot-operated valve comprising:

A) a body forming an inlet, an outlet, a valve seat, and a composite chamber;

B) a diaphragm secured in the composite chamber, dividing the composite chamber into a main chamber and a pilot chamber, being flexible between an open state, in which it is spaced from the valve seat and permits flow from the inlet through the main chamber to the outlet, and a closed state, in which it seats against the valve seat and prevents flow from the main chamber to the outlet, and providing a control orifice therethrough, formed by a main orifice-wall surface and spacer fins that extend radially inward therefrom, that tends to equalize the pressures in the pilot and main chambers and is disposed at a location in the diaphragm that undergoes lateral motion during diaphragm flexure;

C) a pressure-relief mechanism for relieving pressure in the pilot chamber; and

D) a reaming pin slidably disposed in the control orifice and spaced from the main orifice-wall surface by the spacer fins, whereby the reaming pin slides with respect to the diaphragm in the control orifice when the diaphragm flexes and is prevented from causing wear at the main orifice-wall surface.

2. A pilot-operated valve as defined in claim 1 wherein the body forms an outlet conduit that provides the outlet, the outlet conduit forms the valve seat as a mouth thereof, and the main chamber is disposed exterior to the outlet conduit.

3. A pilot-operated valve as defined in claim 1 wherein the pressure-relief mechanism is a manually operated pressure-relief mechanism.

4. A pilot-operated valve as defined in claim 1 wherein the pressure-relief mechanism is an electromechanical pressure-relief mechanism.

5. A pilot-operated valve as defined in claim 1 wherein:

A) the outlet takes the form of an outlet conduit that forms a valve seat as a mouth thereof; and B) the main chamber is disposed exterior to the outlet conduit.

\* \* \* \* \*